United States Patent
Puustinen et al.

(10) Patent No.: US 6,214,168 B1
(45) Date of Patent: Apr. 10, 2001

(54) METHOD AND DEVICE IN A PAPER MACHINE FOR TRANSFER OF THE WEB FROM THE FORMER SECTION TO THE PRESS SECTION

(75) Inventors: Janne Puustinen; Samppa Salminen, both of Jyväskylä; Pertti Heikkilä, Laukaa; Ari Puurtinen; Antti Poikolainen, both of Jyväskylä; Jorma Laapotti, Palokka; Mika Viertola, Jyväskylä, all of (FI)

(73) Assignee: Valmet Corporation (FI)

( * ) Notice: Subject to any disclaimer, the term of this patent is extended or adjusted under 35 U.S.C. 154(b) by 0 days.

(21) Appl. No.: 09/375,220

(22) Filed: Aug. 16, 1999

(30) Foreign Application Priority Data

Aug. 17, 1998 (FI) .......................................... 981762

(51) Int. Cl.$^7$ .................................................. D21F 11/00
(52) U.S. Cl. ..................... 162/205; 162/286; 162/306; 162/358.1; 162/360.2; 162/360.3; 162/202; 162/207; 162/363; 162/193; 162/255
(58) Field of Search .................. 162/360.2, 358.1, 162/360.3, 205, 363, 289, 193, 202, 207, 255, 286, 306

(56) References Cited

U.S. PATENT DOCUMENTS

| | | | |
|---|---|---|---|
| 4,560,438 | 12/1985 | Tell et al. | 162/194 |
| 4,874,470 | * 10/1989 | Skaugen | 162/360.1 |
| 5,665,206 | * 9/1997 | Niskanen | 162/206 |

* cited by examiner

*Primary Examiner*—Stanley S. Silverman
*Assistant Examiner*—Mark Halpern
(74) *Attorney, Agent, or Firm*—Steinberg & Raskin, P.C.

(57) ABSTRACT

A method in a paper machine for transferring a paper web from a wet wire in a former section to a pick-up fabric or an equivalent transfer fabric of a press section, including the steps of forming a pick-up point on the wet wire and separating an edge strip from at least one edge of the web prior to the pick-up point by means of at least one cutting device. The method further includes separating the web from the wet wire and passing the web onto the pick-up fabric at the pick-up point. The method also includes applying a pressure difference to the at least one edge strip through the wet wire or the pick-up fabric at or after the pick-up point to cause the at least one edge strip to either follow the wet wire or become separated from the pick-up fabric after the pick-up point and to be placed in a broke system arranged beneath the paper machine.

16 Claims, 8 Drawing Sheets

METHOD AND DEVICE IN A PAPER MACHINE FOR TRANSFER OF THE WEB FROM THE FORMER SECTION TO THE PRESS SECTION

FIELD OF THE INVENTION

The invention concerns a method in a paper machine for transfer of the paper web that was formed in the former section to the press section. In the method, a pick-up point is formed in connection with the wet wire of the former section, the paper web being transferred in the area of the pick-up point, using a difference in pressure, onto a pick-up fabric or an equivalent transfer fabric. Before the pick-up point, edge strips are separated from one or both edges of the web by means of cutting grooves, the web between the edge strips or the web being separated from the wet wire at the pick-up point and being passed on support of the pick-up fabric or equivalent to the press section in the paper machine.

Further, the invention concerns a device in a paper machine for transfer of the paper web that was formed in the former section to the press section. In the paper machine, a pick-up point for the paper web is formed in connection with the wet wire of the former section, at which pick-up point the paper web is transferred, while making use of a difference in pressure, onto a pick-up fabric or an equivalent transfer fabric. Before the pick-up point, cutter devices are arranged by whose means edge strips are separated from one or both edges of the web. The web between the edge strips is separated from the wet wire at the pick-up point and is passed on the pick-up fabric or equivalent to the press section in the paper machine.

BACKGROUND OF THE INVENTION

Increased running speeds of paper and board machines cause new problems to be solved, which problems are mostly related to the runnability of the machine. At present, speeds of up to about 1600 to 1700 meters per minute are employed in paper machines. At these speeds, so-called closed press sections, which comprise a compact combination of press rolls fitted around a smooth-faced center roll, as a rule, still operate satisfactorily. As examples of such press sections should be mentioned the current assignee's Sym-Press II™ and Sym-Press O™ press sections.

In recent years, as running speeds of printing-paper machines, running speeds as high as about 40 meters per second=2400 meters per minute have been contemplated. Achievement of speeds as high as this, in particular in wide machines, provides ever more difficult problems to be solved, some of the most important of which are runnability of the machine and adequate water drain capacity at a high web speed. In a corresponding way, in board machines (basis weight of web>100 grams per sq. meter), attempts are made to raise the present-day web speeds (8 to 15 meters per second) to a level of 15 to 25 meters per second.

When running speeds of paper machines are increased, the problems of runnability of a paper machine are also encountered with increased emphasis, because a web with high water content and low strength especially does not endure the dynamic forces arising from high web speeds and changes in the running direction of the web, but web breaks and other interference in the operation arise, which will be described in more detail later and which produce standstills or faults of quality in the paper. In a modern printing-paper machine, the cost of break standstill time is currently of an order of 50,000 FIM per hour.

In prior-art press sections, the web is, as a rule, passed from the forming wire into the first press nip on a pick-up felt, which also operates as a press fabric that receives water in the first press nip, which nip is either a roll nip or an extended nip. In the first press nip, it is necessary to use a relatively high compression pressure and to deal with large quantities of water, and it is one drawback arising from this that the outer face of the press felt tends to be contaminated and its porous fabric structure to be partly blocked. Attempts are made to prevent this by means of efficient felt conditioning devices, which are, however, components that are quite expensive, spacious, and consume an abundance of energy. A further drawback of the press felts used in prior-art press sections is their effect of rewetting the web.

In a way known from the prior art, in the vicinity of the wet wire, before the pick-up point, devices for cutting of edge strips off the web, i.e. so-called edge spray cutters, are fitted, by whose means, by means of water jets applied to the web placed on the wet wire, narrow edge strips are cut off from both edges of the web so that a web of uniform width with whole and good edges is obtained to be passed to the press section. As is known from the prior art, the cutters of edge strips can be provided with position regulation devices, by whose means the web cutting width can be adjusted and regulated within certain limits.

By means of the present invention, attempts are made to eliminate problems related to the cutting of the edges of the paper web which have been encountered in the current assignee's test machine when running at a high speed and in particular with webs of relatively low basis weight. When the running speed of the test machine was higher than about 1500 meters per minute, the edge strips that were cut off from the paper web in the wire part before the pick-up roll tended to follow the pick-up felt after the pick-up roll, instead of following the wet wire. This took place in particular when the permeability of the pick-up felt was low. The permeability of the pick-up felt can be low also when new, because of its structure, and in particular when the felt is compacted and contaminated as a result of prolonged service life, as was described above. If the edge strips of the paper web enter fully or partially into the press nips, they cause interference with the runnability and produce fiber strings that damage the press felts and the extended-nip belts.

The above problems related to the cutting of the edges of a paper web and the other difficulties are emphasized further when the web speed approaches 2000 meters per minute and exceeds the speed. It is one of the problems of runnability that, owing to these problems, in the press section it is not possible to employ steam boxes in order to enhance the dewatering. It has not been possible to a major extent to reduce these problems by means of regulation of the cutting width of the water jet devices that cut the edges of the paper web, i.e. of the edge spray cutters, or by means of regulation of the suction width in a pick-up roll.

It is probably one of the reasons for the problems related to the cutting of the edges of the paper web that replacement air flows into the opening nip between the forming wire and the pick-up felt more readily through the forming wire than through the pick-up felt. Since the width of the strip torn off from the edge is approximately equal to the width of the end seals of the suction zone in the pick-up roll, these seals may prevent the flow of replacement air through the holes in the mantle of the pick-up suction roll at the location of the seals. This is also indicated by the fact that it can also be frequently seen in production machines that the edge strips are folded double across a width of about 30 mm after the pick-up point before the edge strip knock-off jets.

OBJECTS AND SUMMARY OF THE INVENTION

By means of the present invention, attempts are made to provide novel solutions for the problems dealt with above, in particular when the web speed is higher than 1500 meters per minute and, as a rule, in a range 1500 to 2500 meters per minute.

It is a particular object of the invention to provide a method and a device of the sort concerned by whose means it can be ensured that either the edge strips run after the pick-up point along with the wet wire or the edge strips are separated from the pick-up felt so that the edge strips can be passed in a controlled way, by the effect of centrifugal forces and, if necessary, by means of knock-off water showers, into a wire pit or equivalent placed underneath.

In view of achieving the objectives stated above and those that will come out later, the method in accordance with the invention for transferring a paper web from a wet wire in a former section to a pick-up fabric or an equivalent transfer fabric of a press section includes forming a pick-up point on the wet wire and separating an edge strip from at least one edge or both edges of the web prior to the pick-up point by means of at least one cutting device. The web is separated from the wet wire and passed onto the pick-up fabric at the pick-up point. The method further includes applying a pressure difference to the edge strips through the wet wire or the pick-up fabric at or after the pick-up point to cause the edge strips to either follow the wet wire or become separated from the pick-up fabric after the pick-up point and to be placed in a broke system arranged beneath the paper machine.

On the other hand, the paper machine in accordance with the invention in which a paper web is transferred from a wet wire in a former section to a pick-up fabric in a press section in a running direction of the web includes a pick-up point located on the wet wire and at least one cutter device arranged in association with the wet wire before the pick-up point in the running direction of the web for separating an edge strip from at least one edge or both edges of the web. The paper machine also includes means for transferring the web from the wet wire to the pick-up fabric at the pick-up point and means for applying a pressure difference to the edge strips through the wet wire or the pick-up fabric at or after the pick-up point to cause the edge strips to either follow the wet wire or become separated from the pick-up fabric after the pick-up point and to be placed in a broke system arranged beneath the paper machine.

In a device in accordance with a preferred embodiment of the invention, the edge strips of the web are kept in contact with the wet wire by vacuum devices of a width substantially equal to the width of the edge strips. An alternative with a full-width vacuum device is also possible, in which case intensifying suction zones can be fitted in the areas of the edge strips. A full-width alternative of a vacuum device may be provided with instantaneous switching off of the vacuum in the middle area as soon as threading of the web starts. By means of this method and device it is possible to improve the quality of the tip of the web in threading, and also in cutting-off the web, when the vacuum of the vacuum device is switched on at a suitable stage.

In accordance with a second preferred embodiment of the invention, pressure devices of a width substantially equal to the width of the edge strips and placed after the pick-up roll and fitted at the location of the edge strips are used, by means of which pressure devices the edge strips are separated from the pick-up felt and passed, for example, by means of a guide plate or plates down to the broke system.

In accordance with a third preferred embodiment of the invention, pressure zones are used, which are placed outside the vacuum zone of the pick-up roll at both sides of the vacuum zone and which have been fitted at the location of the edge strips and which prevent portions placed outside the paper web proper to be passed to the press section from following the pick-up felt.

In a fourth embodiment of the invention it is possible to arrange a blow device of full width inside the loop of the wet wire after the pick-up point, by means of which blow device the web of full width can be separated from the wet wire when the web is not passed to the press section, e.g., in the event of a disturbance in operation.

The alternative embodiments of the method and the device mentioned above can be used each of them alone or as a suitable combination, always as necessary.

The present pick-up method and devices are, as a rule, applied in paper machines whose speed is higher than ~1500 meters per minute. A pick-up method and a device in accordance with the present invention are particularly useful, and in many cases even indispensable, in paper machines whose speed range is 1700 to 2500 meters per minute, in which speed range the problems that are supposed to be eliminated by means of the present invention occur with more emphasis when the speeds that are used become higher.

By means of the method and the device in accordance with the invention, it is possible to ensure in all different situations of operation, also at very high speeds, that the edge strips do not enter into the press section along with the pick-up felt, but the edge strips either follow the wire directly after the pick-up point and fall down into the broke system placed underneath, or are separated from the pick-up felt at the latest in or after the pick-up zone and are passed, for example, by means of a guide plate, into the broke system. Further, in a preferred embodiment of the invention, it is ensured that the web of full width is separated from the wet wire in a situation of operation in which the web is not passed to the press section, for example, in the event of a disturbance in operation, but the web is passed from the wet wire directly into the broke system.

In the following, the invention will be described in detail with reference to some environments of application and exemplifying embodiments of the present invention illustrated in the figures in the accompanying drawing, the invention being in no way strictly confined to the environments or embodiments.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENT

To begin with, reference being made to FIGS. 1 and 6, a typical environment of application of the invention will be described, which includes a compact press section marketed by the current assignee with the trade mark SymPress II B™. It should be emphasized also in this connection that the invention is not confined to the environments of application illustrated in the different figures, but many other environments can also be concerned equally well.

Figure 1:
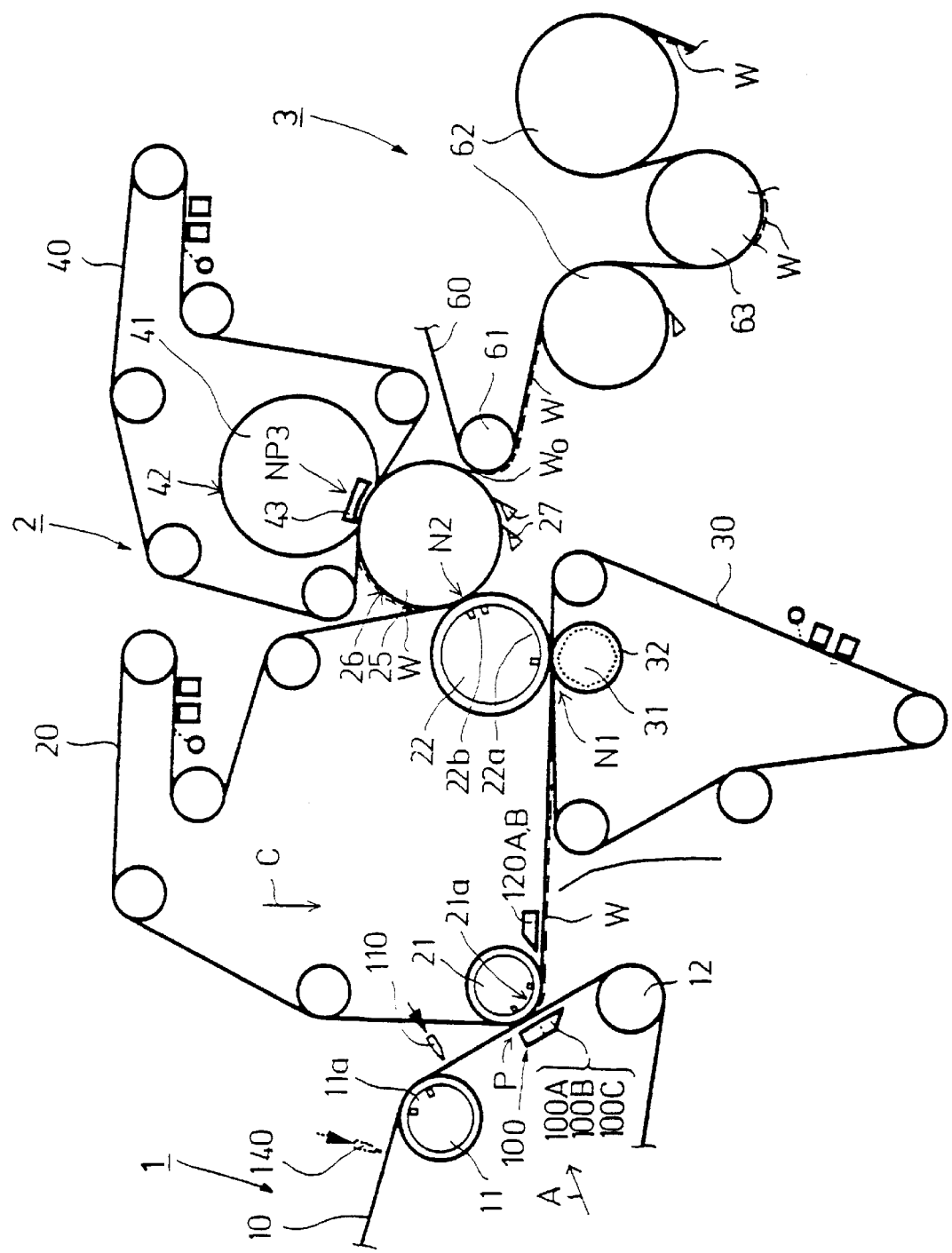
FIG. 1 shows an embodiment of the invention having devices for guiding and transferring the edge strip of the web.
Figure 6:
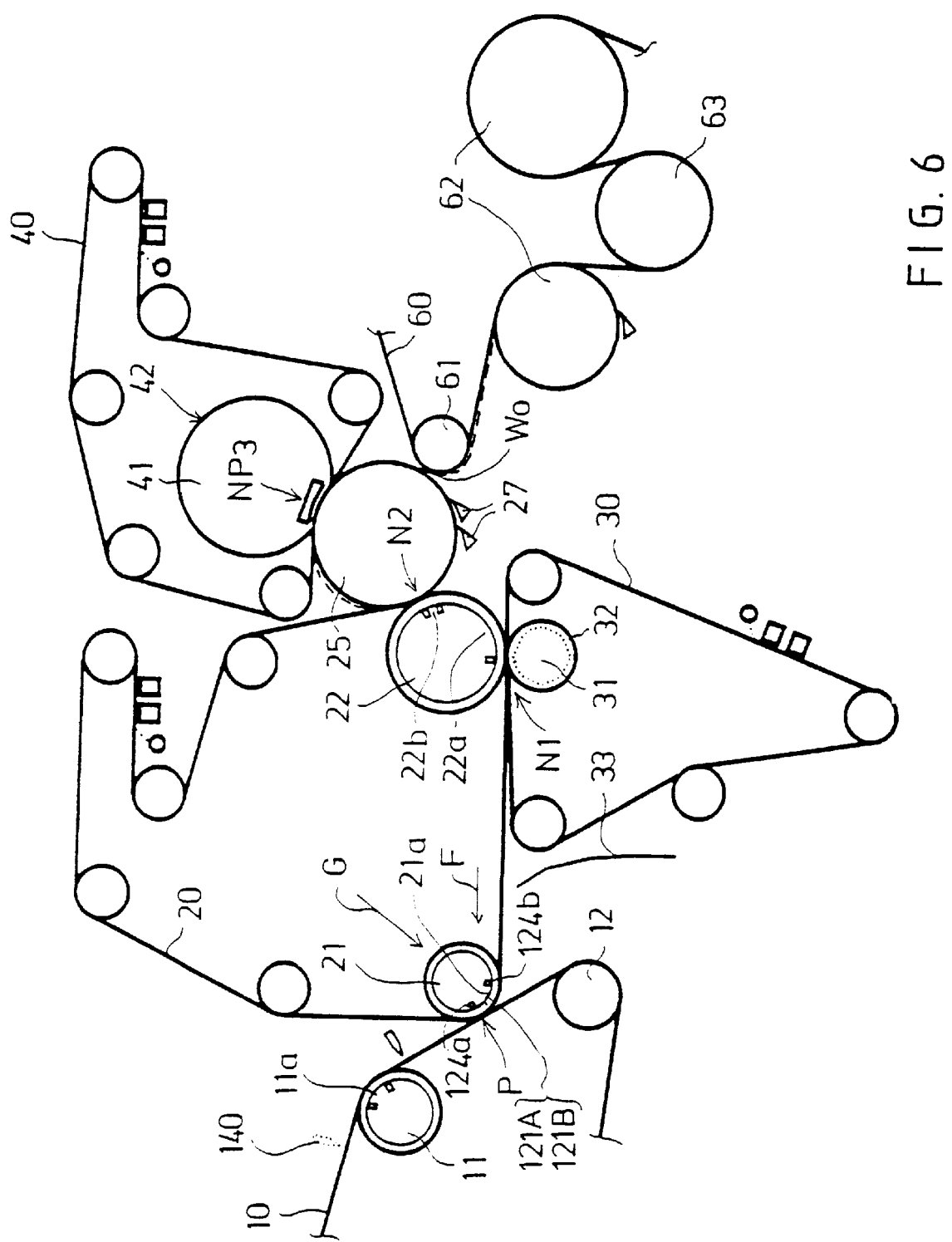
FIG. 6 shows another embodiment of the present invention.

The paper machine as shown in FIGS. 1 and 6 comprises a former section 1, a press section 2, and a dryer section 3. Of the former 1, just the final end is shown, and of the dryer section 3 just the initial end is shown. On the wet wire 10 of the former 1, the web W is brought over the suction zone 11a of the suction roll 11 onto a downwards inclined run of the wet wire 10, which run extends down to the wire drive roll 12. On this downwards inclined run of the wire 10 the paper web W is separated from the forming wire 10, which wire is, for example, a carrying lower wire in a twin-wire former, and the web is transferred by means of the vacuum in the suction zone 21a of the pick-up suction roll 21 onto the pick-up felt 20 at the point P. On the lower face of the pick-up felt 20 the web W is transferred into the first nip $N_1$ in the press section, in which the pick-up felt 20 operates as an upper fabric. The first nip $N_1$ is formed by an upper press suction roll 22, in which there are successive suction zones 22a and 22b, and by a lower, hollow-faced 32 press roll 31. Through the first nip $N_1$, a lower belt 30 runs, which receives water and from which the web W is separated so as to follow the upper felt 20, with the aid of the vacuum in the suction zone 22a of the suction roll 22.

In FIGS. 1 and 6, the second nip $N_2$ in the press section is formed between the suction roll 22 and a smooth-faced 26 center roll 25. The second roll nip $N_2$ is placed on the suction zone 22b of the suction roll 22. After the nip $N_2$ the web W follows the smooth face 26 of the center roll 25 into the third nip in the press section, which is a what is called extended nip $NP_3$, through which a press fabric 40 that receives water runs. The lower roll in the extended nip $NP_3$ is the center roll 25, and the upper roll is a shoe roll 41, in which there are a resilient and flexible hose mantle and a press shoe 43 of the extended-nip zone $NP_3$, by means of which shoe the necessary press loading and compression pressure are produced in the extended-nip zone. On a lower sector of the center roll 25, after the web W separation point, there are doctors 27, which keep the face of the center roll 25 clean and which separate the web from the smooth face 26 of the center roll 25 when the web is passed into the pulper (not shown) placed underneath, for example, in connection with a disturbance in operation or with threading of the web. From the smooth face 26 of the center roll 25, the web W is separated as a short free draw $W_0$ and transferred onto a drying wire 60 running over a guide roll 61. On this wire the web W is passed into the dryer section 3, in which there are upper steam-heated drying cylinders 62 and lower reversing suction rolls 63.

Figure 2:
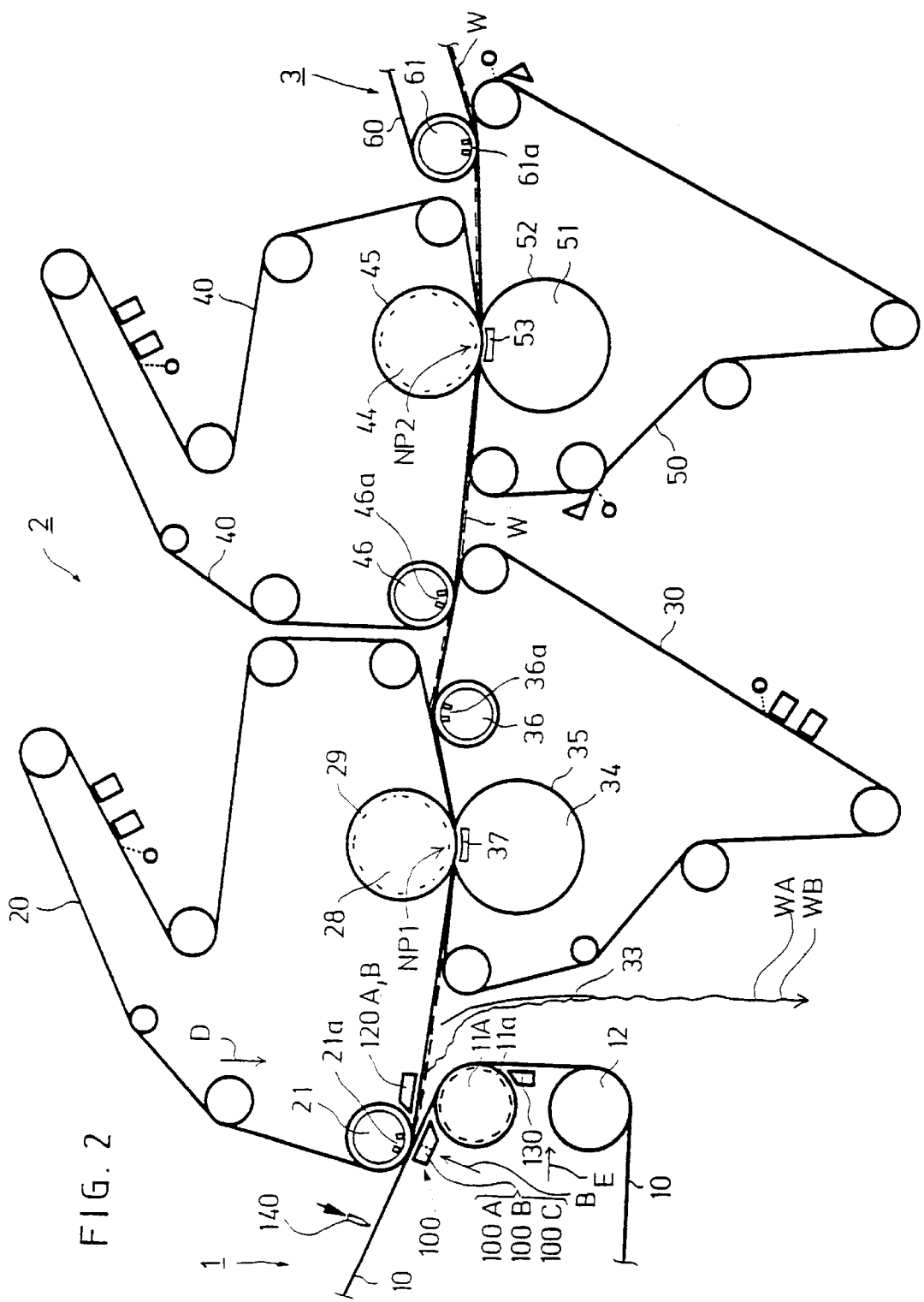
FIG. 2 shows another embodiment of the invention having two successive extended-nip presses and a particular arrangement of pick-up of the web from the lower wet wire.

In the environment of application shown in FIG. 2, the run of the lower wet wire 10 of the former section 1 in the pick-up area differs from that shown in FIGS. 1 and 6. In accordance with FIG. 2, the wet wire 10 of the former section 1, e.g. the carrying lower wire 10 of a twin-wire former, has a gently downwards inclined run onto the wire guide roll 11A, which has an open hollow face 11a. On the wire guide roll 11A, the run of the wet wire 10 is turned substantially straight downwards onto the wire drive roll 12. In FIG. 2, the pick-up point P is placed before the wire guide roll 11A on the gently downwards inclined run of the wet wire 10. The pick-up felt 20 carries the web W into the first extended nip $NP_1$ in the press section 2, which nip is formed between an upper hollow-faced 29 roll 28 and a lower extended-nip roll 34 provided with a flexible hose mantle 35. At the nip zone $NP_1$, inside the hose mantle 35, there is a press shoe 37. In the first nip NP, the lower fabric is a press felt 30, from which the web W is separated on the suction zone 36a of the transfer suction roll 36, being passed so that it follows the lower felt 30 onto the upper felt 40 of the second extended nip $NP_2$, onto which the web W is transferred with the aid of the vacuum present in the suction zone 46a of the transfer suction roll 46. On the upper felt 40 of the second nip $NP_2$, the web W is transferred into the second extended nip $NP_2$, which is formed between a hollow-faced 45 press roll 44 and a lower extended-nip roll 51. The extended-nip roll is provided with a flexible hose mantle 52 and with a press shoe 53. After the extended-nip zone $NP_2$, the web W follows the lower fabric 50 of the zone, which fabric is a press felt or a transfer belt, by whose means the web W is passed onto the drying wire 60 of the dryer section 3 with the aid of the vacuum present in the suction zone 61a of the transfer suction roll 61.

Figure 3:
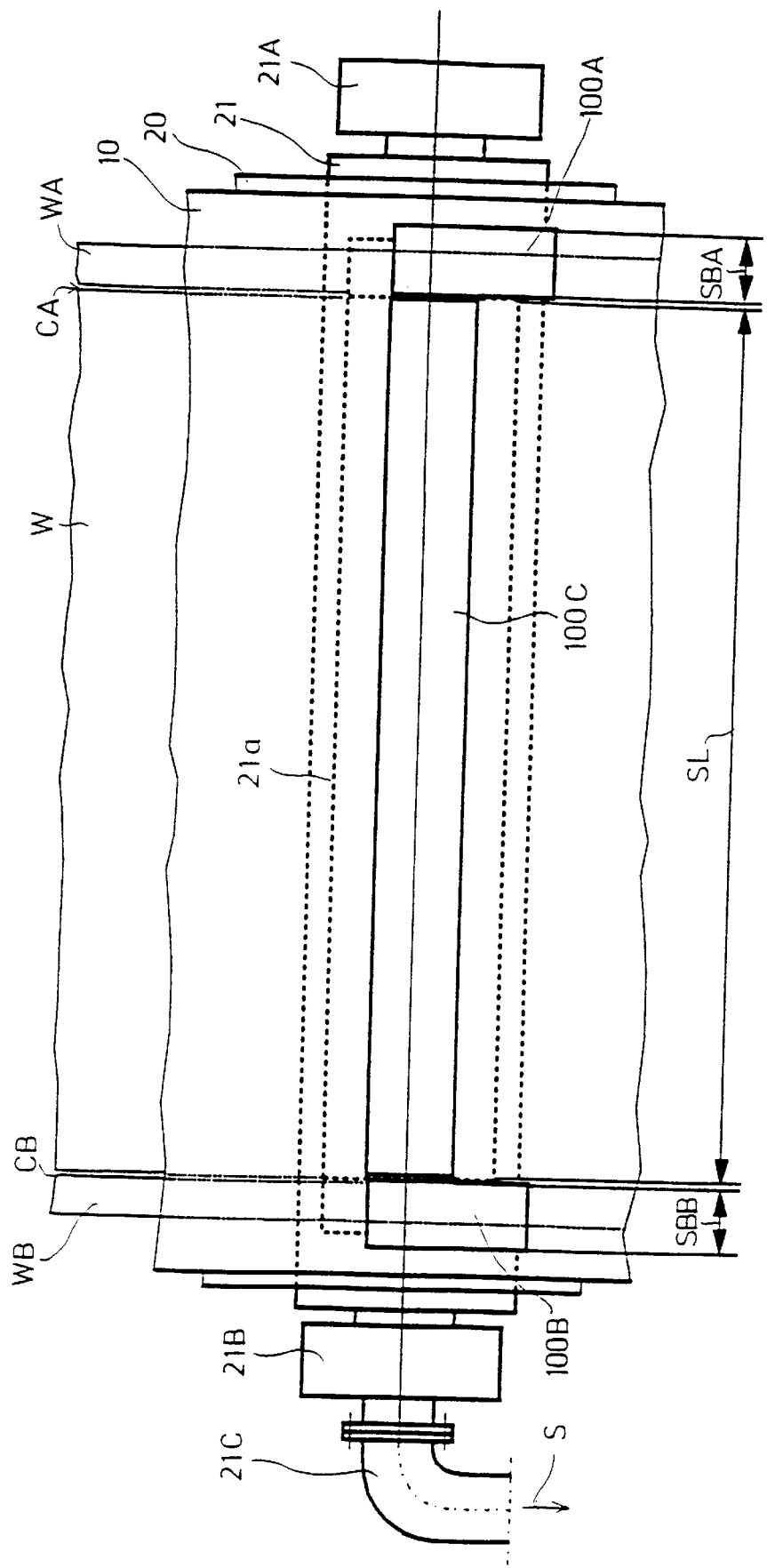
FIG. 3 shows a device of the present invention as viewed in the direction A indicated in FIG. 1 and in the direction B indicated in FIG. 2.

As is shown in FIGS. 1 to 5, edge strips WA and WB are cut off from the paper web W formed on the wet wire 10 by means of water spray cutters 110 or, as an alternative, by means of water spray cutters 140. The edge strips WA, WB are separated from the useful web by means of cut grooves CA and CB, which are seen in FIG. 3. In a normal situation of operation, the edge strips WA and WB are separated, after the pick-up point P, from the pick-up felt 20 and follow the wet wire 10 and are guided at the latest by means of a guide plate 33 into the broke system, such as a wire pit or pulper placed underneath.

In the device as shown in these figures, the edge strips of the web W are kept in contact with the wet wire 10 by vacuum devices 100A and 100B of a width approximately equal to the width of the edge strips WA and WB. FIG. 3 illustrates a full-width alternative of a vacuum device 100. The vacuum device 100 comprises adjacent vacuum boxes 100A, 100B, 100C. The boxes 100A, 100B placed in the lateral areas of the device 100 constitute the intensified suction zones placed at the locations of the edge strips WA, WB, between which there is a vacuum box 100C of the middle area. It is possible to switch on pressure to the chamber 100C in order to facilitate separation of the web passing to the press section at the time of threading and also during constant operation. A preferred embodiment of the method of the present invention includes instantaneous switching off of the vacuum in the vacuum box 100C of the middle area right at the beginning of threading. By means of this method, it is possible to improve the quality of the tip of the web W during threading and also in connection with cutting off when the vacuum of the middle vacuum box 100C is switched on at a suitable stage.

FIG. 3 illustrates the pick-up suction roll 21, in which there is a suction zone 21a. The pick-up roll 21 has been mounted from its axle journals by means of bearing supports 21A and 21B. In connection with the second bearing support 21B, a suction pipe 21C has been fitted, through which a vacuum is sucked into the suction zone 21a by means of vacuum pumps, which is illustrated by the arrow S in FIG. 3.

In FIG. 3, the widths of the vacuum boxes 100A and 100B placed at the edge strips WA and WB are denoted with SBA and SBB. The trimmed width of the web W is denoted with the reference SL in FIG. 3. The sum SL+SBA+SBB of the widths can be somewhat larger than the untrimmed width of the web W. The widths SBA and SBB can also be smaller than the widths of WA and WB, for the edge at the side of cutting is more critical. In this way, excessive sucking of the web edge is also prevented.

In accordance with FIG. 2, after the pick-up roll 21, there are pressure boxes 120A, 120B of a width substantially equal to the width of the edge strips WA, WB and placed facing the edge strips, by means of which pressure boxes the edge strips WA, WB are separated from the pick-up felt 20 and guided, for example, by means of guide plates 33 down into the broke system.

Figure 9:
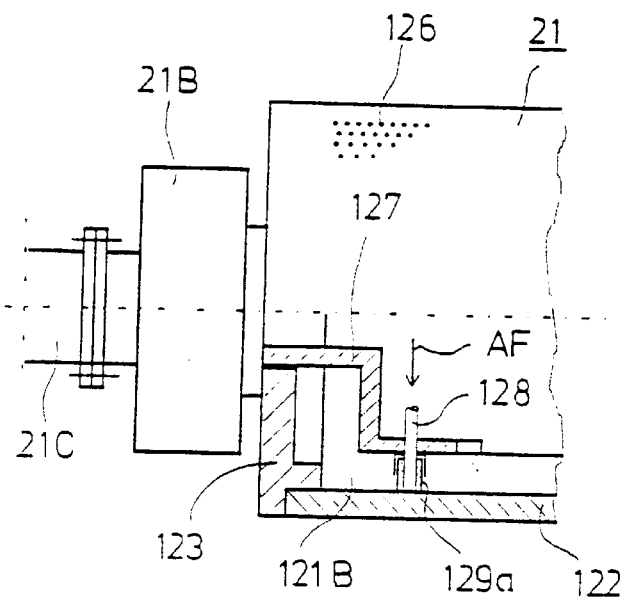
FIG. 9 is a partial central axial sectional view of the embodiment of the invention shown in FIG. 6 as viewed in the direction F indicated in FIG. 6.
Figure 10:
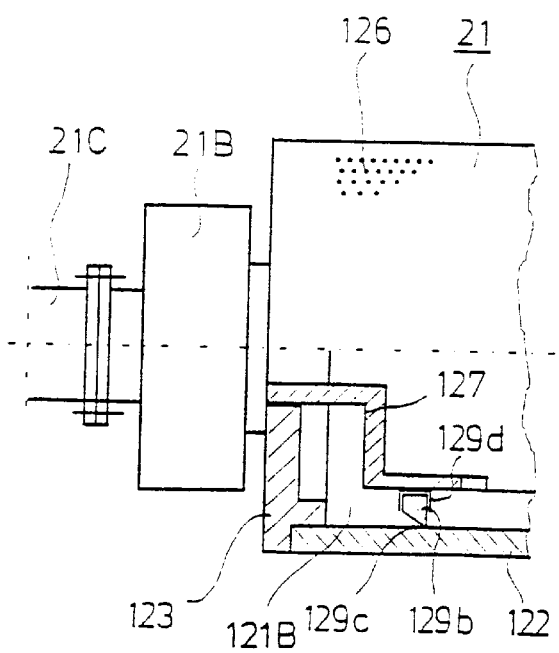
FIG. 10 is a modification of the embodiment of the invention shown in FIG. 9.

FIGS. 6, 9 and 10 show pressure zones 121A and 121B, which are placed outside the vacuum zone 21a of the pick-up roll 21 at both sides of the vacuum zone and facing the edge strips WA, WB, which pressure zones prevent the edge strips WA, WB, which are placed outside the paper web W proper to be passed into the press section, from following the pick-up felt 20.

The various alternatives of equipment of the present invention that have been described above and that will be described later can be employed either alone or as a suitable combination, as required, and to the combination of equipment it is possible, for example, to add part components when the web speed is increased so that the effects and functions supposed to be achieved by means of the present invention can be secured in all situations.

In the following, the details of the illustrations in FIGS. 3 to 5 and 7 to 10 viewed in different directions will be described in more detail.

FIG. 3 shows the equipment alternative 100 shown in FIGS. 1 and 2 as viewed in the direction A indicated in FIG. 1 and in the direction B indicated in FIG. 2. The suction roll 21 shown in FIG. 3 may be provided with a drive of its own (not shown), or it may be driven by the pick-up felt 20.

Figure 4:
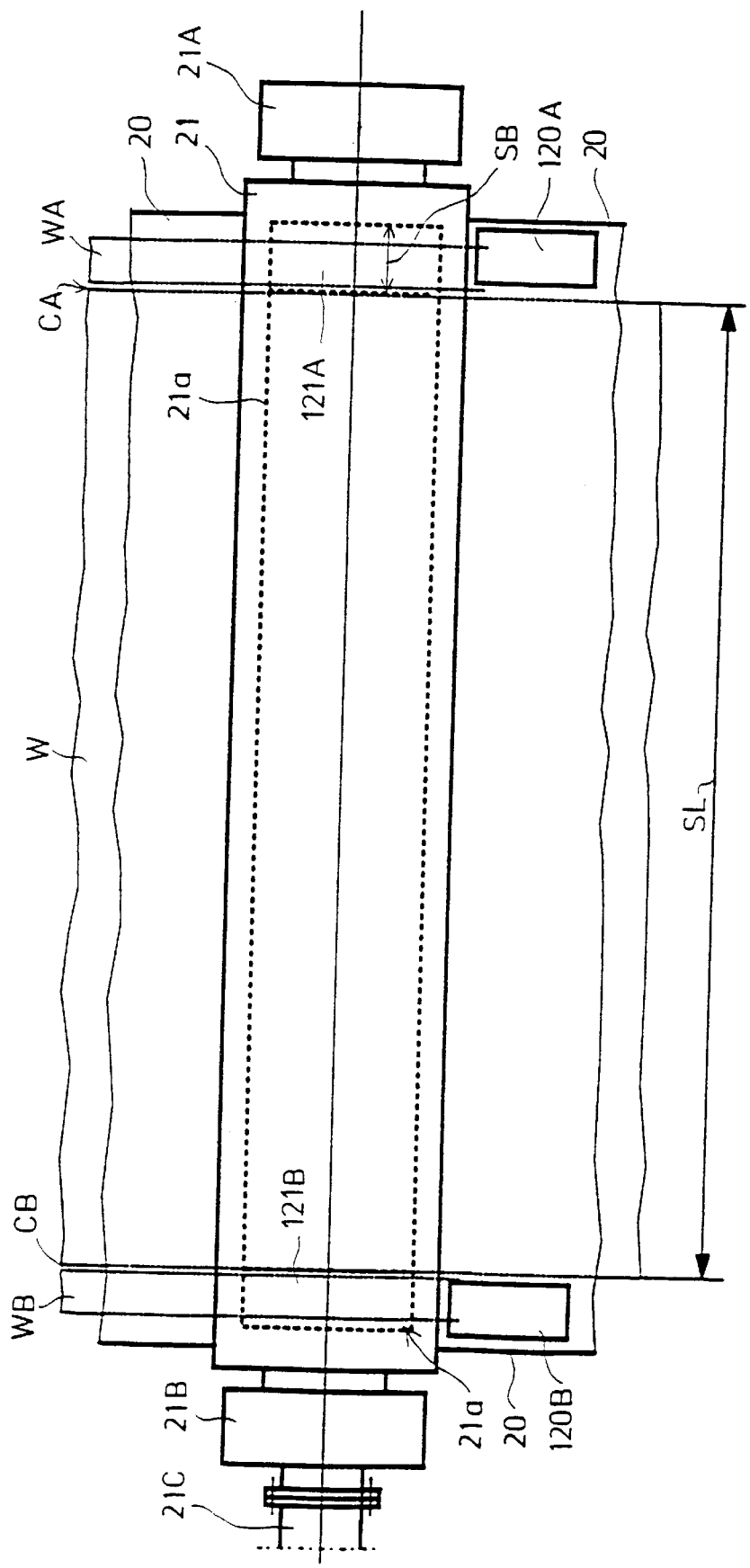
FIG. 4 shows a second device of the present invention as viewed in the direction C indicated in FIG. 1 and in the direction D indicated in FIG. 2.

FIG. 4 shows the equipment alternative 120A, 120B shown in FIGS. 1 and 2 as viewed in the direction C indicated in FIG. 1 and in the direction D indicated in FIG. 2. FIG. 4 shows the blow boxes 120A, 120B placed after the pick-up point P, which boxes are placed outside the trimming width SL of the paper web W facing the edge strips WA, WB and blow the edge strips, in accordance with FIG. 2, apart from the pick-up felt 10 to as to be guided by means of the guide plate 33 into the pulper placed underneath. Moreover, FIG. 4 shows the blow boxes 121A, 121B placed outside the suction zone 21a of the suction roll 21 at both sides of the suction zone, the blow width of the blow boxes being denoted with SB, and the blow width extending outside the width SL of the trimmed paper web W across the width of the edge strips WA, WB or slightly beyond the width outside.

Figure 5:
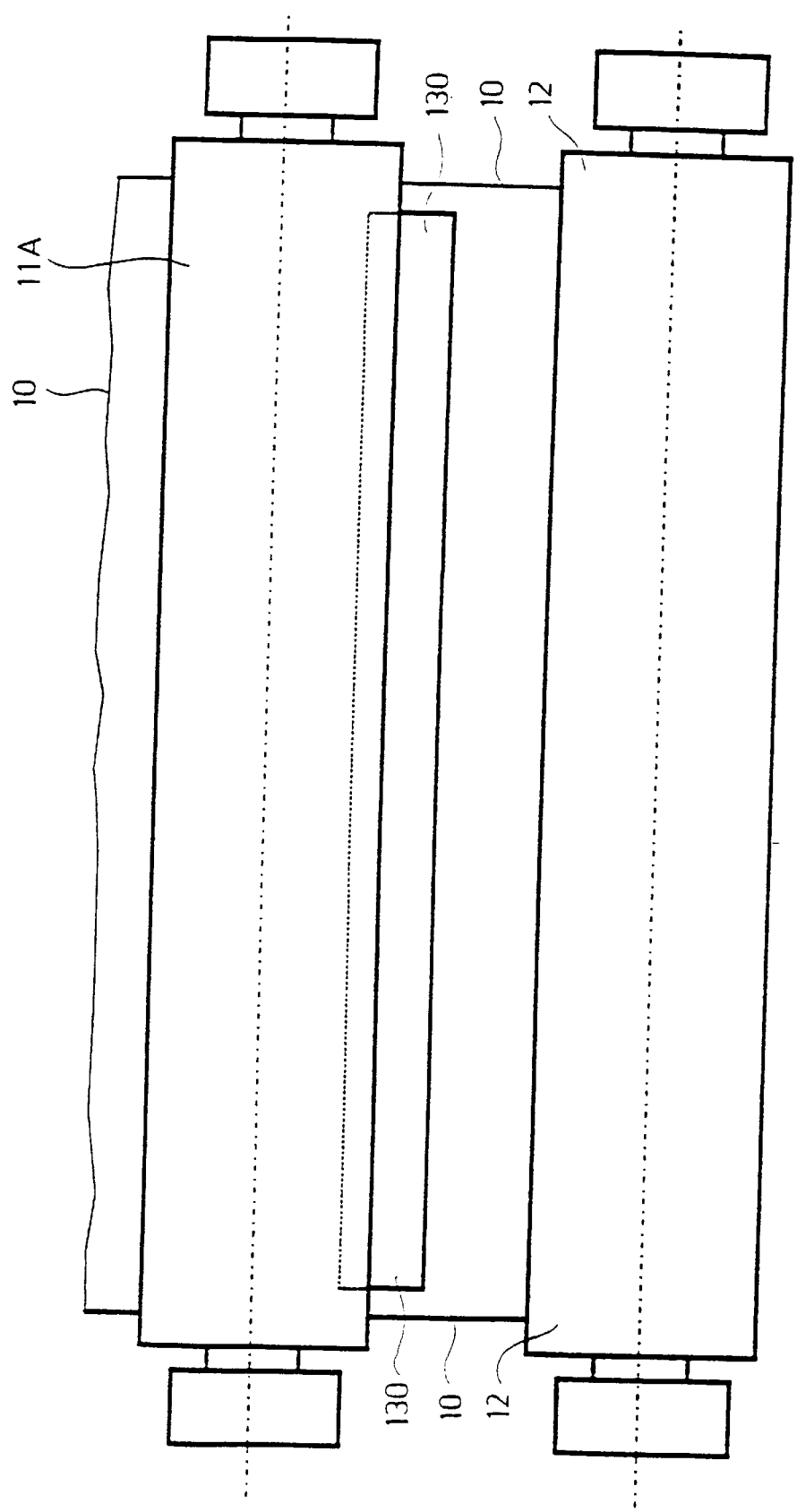
FIG. 5 shows a third device of the present invention as viewed in the direction E indicated in FIG. 2.

FIG. 5 shows the pressure or blow device 130 as viewed in the direction E indicated in FIG. 2. The pressure device 130 has been fitted after the wire guide roll 11 A in connection with the downwards inclined run of the wet wire 10 before the wire drive roll 12. The width of the device 130 is slightly smaller than the width of the wet wire 10. FIG. 5 shows the wire guide roll 11A and the wire drive roll 12. By means of the pressure device 130 it is secured that, when the web W is not passed into the press section 2, the web W of full width can be separated reliably from the wet wire 10, from which it is dropped down into the broke system placed underneath. If the web W tends to be separated from the wire 10 too early because of the field of centrifugal forces of the wire guide roll 11A, in stead of blowing, a suitable vacuum can also be switched on in the device 130, in which case the web follows the wet wire better and is not separated from it until by means of knock-off water showers.

Figure 7:
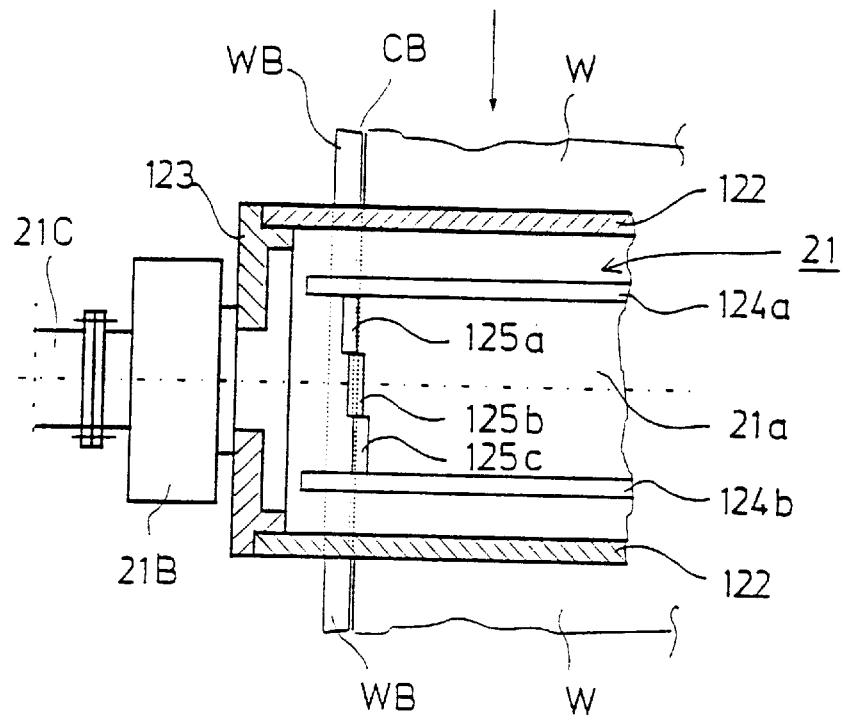
FIG. 7 is a central sectional axial view of the embodiment of the invention shown in FIG. 6 as viewed in the direction G indicated in FIG. 6.
Figure 8:
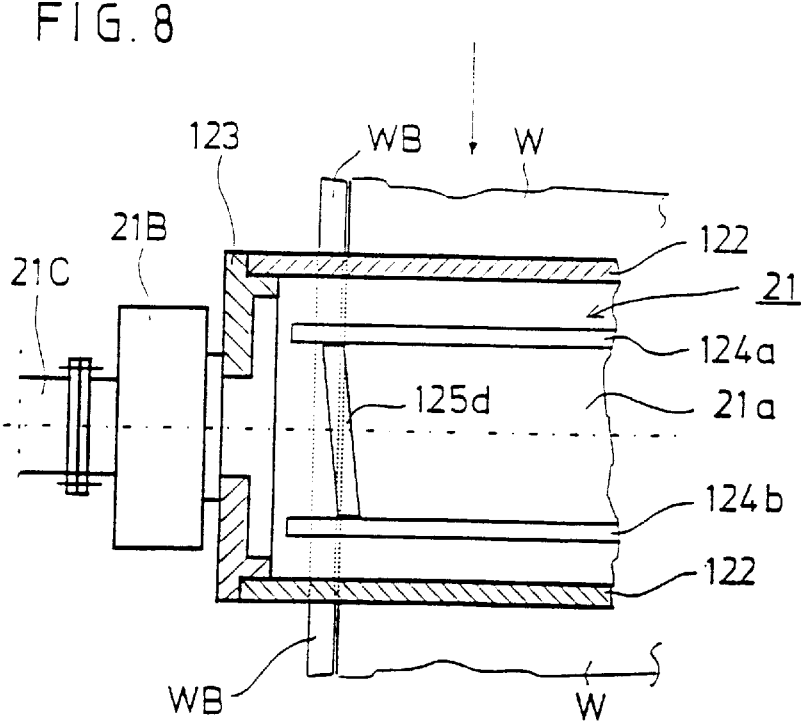
FIG. 8 is a modification of the embodiment of the invention shown in FIG. 7.

FIGS. 7 and 8 illustrate the end part of the pick-up suction roll 21 placed at the side of the suction duct 21C as viewed in the direction G indicated in FIG. 6. The suction zone 21a is defined between axial edge seals 124a, 124b in the axial direction of the pick-up suction roll 21. The pick-up suction roll 21 has a perforated mantle 122 and closed ends 123, which have been connected with the axle journals provided with bearings. The suction zone 21a is defined by a stepped end seal 125a, 125b, 125c fitted at the cut groove (FIG. 4) of each edge strip WA, WB. In the direction of progress of the web W, the first end seal 125a is placed outside the trimming width SL of the web W and completely on the area of the edge strip WB. The middle end seal 125b is placed on the cut groove CB, and the last end seal 125c is placed inside the trimming width SL of the web W so that the outer edge of the end seal 125c is placed on the cut groove CB. By means of the stepped construction of the end seal 125a, 125b, 125c, which narrows the suction zone 21a stepwise at its ends in the direction of progress of the web W, it is achieved that the edge strips WA, WB are separated from the pick-up felt 20 more reliably even at very high web speeds.

FIG. 8 shows a modification of the construction shown in FIG. 7. The end seal 125d of the suction zone 21a is in an inclined position at the cut groove CB so that, in the direction of progress of the web, at the location of the first axial seal 124a, the inner side of the end seal 125d is placed on the cut groove CB, whereas at the outlet end of the inclined end seal 125d the outside edge of the seal is placed on the cut groove CB at the location of the latter axial seal 124b. By means of this inclined construction, the same effect is obtained as by means of the stepped end seal construction as shown in FIG. 7.

In the arrangement of the end area of the suction zone 21a of the suction roll 21 shown in FIGS. 7 and 8, the trimmed paper web W is sucked into contact with the pick-up felt 20 in the beginning of the suction zone 21a after its first seal 124a, after which the suction holes 126 (FIGS. 9 and 10) in the mantle 122 of the suction roll 21 keep the edges of the web W in contact with the pick-up felt 20 at the same time as the opening suction holes 126 at the side of the edge strips WA, WB allow the edge strips WA, WB to be separated from the pick-up felt 20. This same effect is produced both by means of the stepped seal construction 125a, 125b, 125c as shown in FIG. 7 and by means of the inclined seal construction 125d as shown in FIG. 8. The stepped seal construction as shown in FIG. 7 has the particular advantage that each seal 125a, 125b, 125c can be set independently from the others in such a location that the operation is carried into effect optimally. In the inclined seal construction 125d the angle of inclination can be made adjustable for the purpose mentioned above.

FIGS. 7 and 8 illustrate just one end of the pick-up suction roll 21, but it is obvious that a corresponding arrangement of edge seals 125*a*, 125*b*, 125*c*; 125*d* has been fitted in connection with the opposite end of the suction roll 21 and of its suction zone 21*a* on, and in the area of, the edge strip WA and the cut groove CA in the way illustrated in FIGS. 7 and 8.

FIGS. 9 and 10 illustrate the construction of the pressurized blow boxes 121A and 121B placed in the vicinity of the ends 123 of the pick-up suction roll 21 as viewed in the direction F indicated in FIG. 6. FIGS. 9 and 10 show just one blow box 121B, but a corresponding box 121A is also provided at the opposite end of the suction roll 21. The blow box 121B is defined by the inner wall 127 and by the end 123 of the roll and by the perforated 126 mantle 122 of the roll 21. In the blow box 121B, on the end seal (FIGS. 7 and 8) of the suction zone 21*a* and on the cut groove CB of the edge strip WB, there is an end seal 129*a*, which seals the blow zone 121B against the inner face of the roll 21 mantle 122. The pressurized end area and the end seal constructions shown can be employed together or separately. Also a stepped seal construction and an inclined seal construction are possible between the blow zone and the suction zone. As is shown in FIG. 9, the end seal 129*a* has been perforated over its entire length in the machine direction. Into these several holes, air is fed through the pipes 128. Such a use can be arranged in accordance with a need of pressure or vacuum, which is illustrated by the arrow AF. Out of the pipes 128 and out of the holes in the seal 129*a*, air has access into the holes 126 in the mantle 122 of the roll 21 placed on the cut grooves CA, CB and on the inner edges of the edge strips WA, WB, whereby separation of the edge strip WB from the pick-up felt 20 is promoted. The construction of the blow box 121B shown in FIG. 10 is in the other respects similar, except that its end seal is a narrow-tipped seal rib 129*b*, which has been attached to the wall 127 by means of fastening parts 129*d*. The tip edge 129*c* of the seal rib 129*b* is placed at the side of its inner side. By means of a seal rib 129*b* as shown in FIG. 10, the closed area that keeps the edge strip WA, WB in contact with the pick-up felt 20 is minimized, while the rigidity of the seal rib 129*b* is, however, retained. In stead of the holes that have been formed into the end seals 129*a*, of course, a set of ducts or any other, equivalent solution known to a person skilled in the art can be formed into the end seals 129*a*, by means of which ducts or equivalent air can be fed through the end seals 129*a* and through the holes 126 in the end areas of the mantle 122 of the roll 21 into the cut grooves CA, CB and to the inner edges of the edge strips WA, WB of the web W.

If necessary, the above equipment alternatives 100 and 120A, 120B are connected with transfer devices (not shown), by whose means the devices 100, 110 can be shifted in the cross direction of the machine. By means of these transfer devices, the edge strips WA, WB to be trimmed off from the web W are adjusted so that they follow the wet wire 10 directly or that they are at least dropped off from the pick-up felt 20. In a third alternative (FIGS. 6, 9 and 10), the suction width of the pick-up roll 21 has been regulated precisely in relation to the positions of the cut grooves CA and CB of the edge strips WA, WB, and the pressure zones 121A and 121 B are placed directly outside the vacuum zone 21*a* of the roll 21.

FIG. 2 shows the final part of a former type in which there is no conventional wire suction roll, such as the roll 11 in FIG. 1, but the pick-up point P is placed before the wire guide rolls on a downwards inclined run of the wet wire 10, which is less steep than in FIG. 1. The press section shown in FIG. 2 is of the SymBelt II type. In FIG. 2, the equipment alternatives 100 and 120A, 120B that prevent passing of the edge strips WA, WB into the press section are the same as in FIG. 1. In this alternative embodiment of the final end of the former, the edge strips WA, WB of the web W are even more readily inclined to follow the pick-up felt 20 than in the embodiment as shown in FIG. 1. In the alternative embodiment as shown in FIG. 2, the web W of full width must follow the wet wire 10 also after the upper wire guide roll 11A at a stage in which the web W is not passed into the press section 2. This can be promoted, for example, by means of a grooved 10*a* wire guide roll 10A and by means of a full-width vacuum device 130 fitted after the wire guide roll.

In the following, the patent claims will be given, and the various details of the invention can show variation within the scope of the inventive idea defined in the claims and differ from what has been stated above by way of example only.

We claim:

1. In a method in a paper machine for transferring a paper web from a wet wire in a former section to a pick-up fabric or an equivalent transfer fabric of a press section, including the steps of forming a pick-up point on the wet wire, separating an edge strip from at least one edge of the web prior to the pick-up point by means of at least one cutting device, and separating the web from the wet wire and passing the web onto the pick-up fabric at the pick-up point, the improvement comprising:

applying a pressure difference to the at least one edge strip through the wet wire or the pick-up fabric at or after the pick-up point by means of blow boxes arranged within the pick-up fabric to blow onto the pick-up fabric and thereby prevent the at least one edge strip from following the pick-up fabric.

2. In a method in a paper machine for transferring a paper web from a wet wire in a former section to a pick-up fabric or an equivalent transfer fabric of a press section, including the steps of forming a pick-up point on the wet wire, separating an edge strip from each edge of the web prior to the pick-up point by means of cutting devices, and separating the remaining web from the wet wire and passing the web onto the pick-up fabric at the pick-up point, the improvement comprising:

applying a pressure difference to the edge strips through the wet wire or the pick-up fabric at or after the pick-up point by means of blow boxes arranged within the pick-up fabric to blow onto the pick-up fabric and thereby prevent the at least one edge strip from following the pick-up fabric.

3. The method as in claim 1, wherein said step of applying a pressure difference to the at least one edge strip comprises applying a pressure difference to the at least one edge strip through the wet wire at or after the pick-up point by means of pressure difference devices arranged within the wet wire to cause the at least one edge strip to follow the wet wire.

4. The method as in claim 3, further comprising the step of applying a pressure difference to the web through the wet wire such that the pressure difference applied to the web is less than the pressure difference applied to the at least one edge strip.

5. The method as in claim 4, wherein the method takes place during threading and during constant running of the web, the method further comprising the step of reducing the pressure difference applied to the web through the wet wire during threading of the web.

6. The method as in claim 1, wherein said step of applying a pressure difference to the at least one edge strip comprises applying a pressure difference to the at least one edge strip through the pick-up fabric at or after the pick-up point by means of at least one blow zone arranged within at least one side of a suction zone of a pick-up suction roll arranged within the pick-up fabric proximate to the pick-up point to cause the at least one edge strip to separate from the pick-up fabric.

7. The method as in claim 6, wherein the at least one edge strip is separated from the at least one edge of the web at an at least one cut groove, the method further comprising the step of applying air to the at least one cut groove by means of at least one duct arranged in connection with the at least one blow zone to cause the at least one edge strip to be separated from the web.

8. The method as in claim 6, wherein the at least one edge strip is separated from the at least one edge of the web at an at least one cut groove, the method further comprising the step of applying air to the at least one cut groove by means of at least one perforation arranged in connection with the at least one blow zone to cause the at least one edge strip to be separated from the web.

9. The method as in claim 1, further comprising the step of applying a pressure difference to the web after said pick-up point to cause the web to be separated from the wet wire and passed onto the pick-up fabric if the web fails to be passed onto the pick-up fabric at the pickup point.

10. In a paper machine in which a paper web is transferred from a wet wire in a former section to a pick-up fabric, arranged in a loop, in a press section in a running direction of the web, including a pick-up point located on the wet wire, at least one cutter device arranged in association with the wet wire before said pick-up point in the running direction of the web for separating an edge strip from at least one edge of the web, and means for transferring the web from the wet wire to the pick-up fabric at said pick-up point, the improvement comprising:

means for applying a pressure difference to the at least one edge strip through the wet wire or the pick-up fabric at or after said pick-up point to cause said at least one edge strip to either follow the wet wire or become separated from the pick-up fabric after the pick-up point and structured and arranged inside said loop of said pick-up fabric after said pick-up point.

11. In a paper machine in which a paper web is transferred from a wet wire in a former section to a pick-up fabric, arranged in a loop, in a press section in a running direction of the web, including a pick-up point located on the wet wire, cutter devices arranged in association with the wet wire before said pick-up point in the running direction of the web for separating an edge strip from each edge of the web, and means for transferring the remaining web from the wet wire to the pick-up fabric at said pick-up point, the improvement comprising:

means for applying a pressure difference to said edge strips through the wet wire or the pick-up fabric at or after said pick-up point to cause said edge strips to either follow the wet wire or become separated from the pick-up fabric after said pick-up point and structured and arranged inside said loop of said pick-up fabric after said pick-up point.

12. The paper machine as in claim 10, wherein
said wet wire is arranged in a loop, and
said means for applying a pressure difference to said at least one edge strip comprises at least one pressure-difference device arranged inside the loop of said wet wire proximate to said pick-up point.

13. The paper machine as in claim 12, wherein said pressure-difference device comprises a middle box structured and arranged to apply a pressure difference to said web and at least one outer box structured and arranged to apply a pressure difference to said at least one edge strip, said pressure difference of said at least one outer box being higher than said pressure difference of said middle box.

14. The paper machine as in claim 10, wherein said means for transferring the web from the wet wire to the pick-up fabric comprises a pick-up suction roll having two ends, said pick-up suction roll comprising
a suction zone, and
blow zones arranged in said suction zone at the ends of said pick-up suction roll.

15. The paper machine as in claim 10, wherein the pick-up fabric is arranged in a loop, the improvement further comprising
a wire guide roll arranged after said pick-up point, and
pressurized pressure-difference devices arranged inside the loop of the pick-up fabric.

16. The paper machine as in claim 10, wherein the wet wire is arranged in a loop, the improvement further comprising
a wire guide roll arranged after said pick-up point, and
a pressurized blow device arranged after said wire guide roll and inside the wet-wire loop.

* * * * *